United States Patent [19]

Borchardt

[11] Patent Number: 5,258,099
[45] Date of Patent: Nov. 2, 1993

[54] OFFICE WASTEPAPER DEINKING PROCESS USING FATTY ALCOHOLS

[75] Inventor: John K. Borchardt, Houston, Tex.

[73] Assignee: Shell Oil Company, Houston, Tex.

[21] Appl. No.: 917,694

[22] Filed: Jul. 17, 1992

[51] Int. Cl.$^5$ .............................................. D21C 5/02
[52] U.S. Cl. .......................................... 162/5; 162/8
[58] Field of Search ........................................ 162/5, 8

[56] References Cited

U.S. PATENT DOCUMENTS

| | | | |
|---|---|---|---|
| 3,932,206 | 1/1976 | Illingworth et al. | 162/5 |
| 4,162,186 | 7/1979 | Wood et al. | 162/5 |
| 4,518,459 | 5/1985 | Freis et al. | 162/5 |
| 4,561,933 | 12/1985 | Wood et al. | 162/5 |
| 4,628,400 | 10/1986 | Wood et al. | 162/5 |
| 4,666,558 | 5/1987 | Wood et al. | 162/5 |

FOREIGN PATENT DOCUMENTS

| | | |
|---|---|---|
| 729070 | 3/1966 | Canada . |
| 31804 | 3/1978 | Japan . |
| 51892 | 4/1980 | Japan . |
| 186592 | 8/1986 | Japan . |
| 717195 | 3/1978 | U.S.S.R. . |

*Primary Examiner*—Karen M. Hastings
*Attorney, Agent, or Firm*—Pamela J. McCollough

[57] ABSTRACT

This invention related to a process for the deinking of office wastepaper stocks which includes: converting the wastepaper to a pulp, contacting the pulp with an aqueous medium of alkaline pH containing between about 0.05 and about 2 percent by weight, calculated on a dry weight basis of the pulp, of a deinking agent which is at least one fatty alcohol having in the range of from about 8 to about 18 carbon atoms, without the use of other deinking agents, and treating the resulting pulp-containing medium by washing or flotation to removed suspended ink therefrom.

16 Claims, No Drawings

OFFICE WASTEPAPER DEINKING PROCESS USING FATTY ALCOHOLS

FIELD OF THE INVENTION

This invention relates to a process for the removal of ink from printed office wastepaper in the course of reclaiming the fiber content of the waste for reuse in the manufacture of new paper. More particularly, the invention relates to a process for the deinking of office wastepaper containing xerographically printed paper.

BACKGROUND OF THE INVENTION

Wastepaper has long served as a source of the raw fiber materials used in papermaking. Traditionally, fiber from wastepaper was utilized only in the production of low grade paper and paperboard products. Today, however, greater utilization of reclaimed fiber has provided incentive for taking steps to upgrade the reclaimed product. These steps include treatment to effectively remove ink from waste fibers in order to permit their use in the manufacture of newsprint and high quality papers. Increasing amounts of office waste paper are becoming available. Because of the high quality cellulose fiber in office waste paper, efficient ink removal is particularly desirable since excellent quality, high value products can be prepared from this deinked pulp.

In the course of the conventional paper reclamation process of interest, deinking procedures include steps for converting the wastepaper to pulp and contacting the pulp with an alkaline aqueous deinking medium containing a chemical deinking agent. The physical pulping and the alkalinity of the aqueous medium cause the partial removal of ink from the pulp fiber and the deinking agent completes this removal and produces an aqueous suspension and/or dispersion of the ink particles thus removed from the pulp. The resulting mixture is subsequently treated to separate the suspended ink from the pulp.

A variety of materials, particularly surfactants and mixtures of surfactants are known to be useful as deinking agents in such a process, at least when the process is applied to the deinking of such common wastepaper-stocks as newsprint, book, magazine and ledger. It is recognized, however, that conventional processes have not been particularly successful in specific application to xerographically printed wastepapers and laser printer wastepapers. The difficulty encountered in the deinking of these wastepapers has been attributed to the character of electrostatic ink, specifically to binder, which is fundamentally different from that used in other printing processes. For example, in distinction to the common oil or resin binders of other inks, the electrostatic ink binder is typically a polymeric material (e.g., polyethylene) which during the printing process is fixed to the paper by application of heat.

The ever-increasing utilization of xerographic and laser printed paper has made reclamation of office wastepaper containing xerographically printed paper economically attractive. Accordingly, the object of the present invention is a deinking process which is effective in the treatment of office wastepaper stock. As used herein, "office wastepaper" refers to xerographically printed stocks which may contain other materials such as laser printed stocks and ledger stocks.

The present invention centers on the use in a deinking process of a chemical deinking agent which is a detergent-range (e.g., $C_8$ to $C_{18}$) fatty alcohol. It is known in the art that the removal of ink from wastepaper can be accomplished by a process in which the paper is reduced to pulp and the pulp is contacted with an aqueous medium containing a surfactant as a deinking agent. For example, it is known from U.S. Pat. No. 4,561,933, that xerographically printed wastepaper can be deinked using a mixture of one or more $C_5$ to $C_{20}$ alkanols and nonionic surfactant. It is also known in the paper deinking art (for example, U.S. Pat. No. 4,162,186) to employ chemical agents which are ethylene oxide adducts ("ethoxylates") of detergent-range alcohols or alkyl-substituted phenols containing an average of about 7 to about 15 oxyethylene units per molecule of alcohol. It is further known from U.S. Pat. No. 4,518,459 to use surfactants for deinking which are hydroxy-terminated or benzyl ether-terminated ethylene oxide-propylene oxide adducts (ethoxypropoxylates) of high molecular weight or long chain alcohols.

It has now been found that certain fatty alcohols are very usefully applied as deinking agents in process for the deinking of office wastepaper. Processes applying fatty alcohol deinking agents are found to offer a high level of performance from the standpoint of the overall brightness of papers prepared from the deinked pulp. In addition, the invention provides for low foaming and high biodegradability without adverse influence upon deinking performance and reclaimed paper product brightness.

SUMMARY OF THE INVENTION

The invention therefore relates to a process for the deinking of office wastepaper stocks which comprises:
a) converting the wastepaper to a pulp,
b) contacting the pulp with an aqueous medium of alkaline pH containing between about 0.05 and about 2.0 percent by weight, calculated on a dry weight basis of the pulp, of a deinking agent comprising at least one fatty alcohol compound having in the range of from about 8 to about 18 carbon atoms, preferably from about 8 to about 15 carbon atoms, and
c) treating the resulting pulp-containing medium by washing or flotation to remove suspended ink therefrom.

DESCRIPTION OF THE PREFERRED EMBODIMENTS

The present invention is generally applicable to the deinking of the office wastepaper stocks, and also to practices and procedures conventionally employed for their processing. Generally, any such process comprises three principal steps: the first, a step to reduce the wastepaper feed to pulp, the second, a contact between the pulp and an alkaline aqueous medium containing the deinking agent to produce a suspension or dispersion of the ink, and, the third, a treatment of the resulting pulp containing medium to remove suspended or dispersed ink particles therefrom. The first two steps of the process, however, may be combined.

The present invention centers upon the composition and performance of the deinking agent. For purposes of the invention, the deinking agent is a detergent-range alcohol having from about 8 to about 18 carbon atoms. Such alcohols are commonly referred to as fatty alcohols. Suitable alcohols have from about 8 to about 18 carbon atoms, preferably from about 8 to about 15 carbon atoms, and more preferably from about 9 to about 11 carbon atoms. Preferably, the alcohols have a carbon structure which is linear (straight chain) or only moderately branched. Predominantly linear alcohols are preferred for reasons relating to biodegradability in process effluents rather than to deinking performance. Similarly, primary alcohols are preferred, although the invention may be suitably practiced using secondary or tertiary alcohols.

Alcohols which are suitable as deinking agents in the instant invention include coconut fatty alcohols, stearyl fatty alcohols, tallow fatty alcohols, and the commercially available synthetic long-chain fatty alcohol blends, e.g., the $C_{12}$ to $C_{15}$ alcohol blends available as NEODOL 25 Alcohol (a registered trademark of product manufactured and sold by Shell Chemical Company), the $C_9$ to $C_{11}$ alcohol blends available as NEODOL 91 Alcohol, the $C_{14}$ to $C_{15}$ alcohol blends available as NEODOL 45 Alcohol, the $C_{12}$ to $C_{14}$ alcohol blends available as Tergitol 24L (a registered trademark of product manufactured and sold by Union Carbide Corporation), and the $C_{12}$ to $C_{13}$ alcohol blends available, for example, as NEODOL 23 Alcohol (Shell).

Preferred alcohols for use as the deinking agents in the present invention are fatty alcohols, preferably linear primary alcohols with about $C_8$ to about $C_{18}$, preferably about $C_{12}$ to about $C_{15}$ alkyl groups.

The invention applies the fatty alcohol deinking agent to wastepaper which is necessarily in the form of a pulp, that is, to wastepaper which has first been substantially reduced to the individual fibers. Pulping is suitably conducted using any of the various conventional processes and equipment designed for this purpose. Most conveniently, the wastepaper process feedstock is treated in a device known as a "hydrapulper", which produces a slurry of the fibers in water having a pH of about 9 to about 12.

After the pulping step, the resulting fibers are contacted in an aqueous medium with the deinking agent. This contacting step may suitably be carried out in the pulping equipment, for example, by simply adding deinking agent and caustic to the aqueous slurry of the hydrapulper. Alternatively, the contact may be carried out using separate processing equipment which provides for agitation of the aqueous pulp slurry. For the contact step, the pulp is present in a quantity typically between about 0.5 percent by weight and about 15.0 percent by weight, calculated as the dry weight of the wastepaper feed relative to total weight of the slurry formed. In a preferred embodiment, the slurry contains between about 1 percent by weight and about 5 percent by weight pulp fiber. The amount of deinking agent present in the slurry is suitably between about 0.05 percent by weight and about 2.0 percent by weight, calculated basis dry fiber weight. In a preferred embodiment, the quantity of deinking agent utilized is between about 0.2 percent by weight and about 1.5 percent by weight, with between about 0.2 percent by weight and about 1.0 percent by weight being particularly preferred.

During contact between the pulp fiber and the deinking agent, it is necessary that the aqueous contact medium be maintained at alkaline pH. A pH value greater than about 7 is preferred, a pH between about 7 and about 13 is more preferred, and a pH between about 8 and about 10 is generally most preferred. The alkalinity is generally maintained by the addition of base such as, for example, caustic or sodium silicate, to the aqueous contact medium. Typically, the amount of base added to the contact medium is in the range of from about 1 percent by weight to about 4 percent by weight calculated basis the dry weight of the pulp fiber.

In addition to water, pulp, base and deinking agent, the contact slurry may further contain other substances conventionally employed in deinking processes such as, for example, brighteners, solvents, antifoam agents, water softeners and the like. If desired, other deinking agents may be present in addition to the fatty alcohol, such as, for example, alcohol ethoxylates, alkylphenol ethoxylates, alcohol propoxyethylates, glycols, and the like. However, the use of additional deinking agents is neither necessary nor preferred.

Processing of the pulp slurry during contact with the deinking agent is preferably carried out at elevated temperatures, particularly temperatures in the range of from about 30° C. to about 100° C. The invention has been found to be particularly effective at a temperature in the range of from about 40° C. to about 80° C., while a temperature in the range of from about 45° C. to about 60° C. is considered especially preferred.

The contact time for the wastepaper pulp and the aqueous deinking medium is not critical for purposes of this invention. However, a contact time of greater than about 10 minutes is preferred from the standpoint of deinking performance. For purposes of process efficiency, it is preferred that the contact time be in the range of from about 20 minutes to about one hour, and more preferred that the contact time be in the range of from about 20 minutes to about 45 minutes.

Following the contact step between the pulp and the aqueous medium containing the fatty alcohol deinking agent, the mixture is treated for separation between the pulp fibers and the ink particles which are both dispersed, or suspended, in the medium. Separation of one or the other from the medium is suitably carried out by techniques commonly applied in conventional deinking practices, including those treatments known in the art as washing and flotation. In washing, the ink particles are rinsed from the pulp by contact with a flow of water, usually a countercurrent flow relative to the pulp. Among the devices commerically used for washing and suitable for use in the practice of the present invention are the sidehill screen, the gravity decker or drum washer, the inclined screw extractor, the screw press, and centrifugal cleaners of various designs. Floation methods of ink isolation generally involve bubbling a stream of air or another gas through the pulp. The air bubbles rise to the surface and carry the ink particles with them thereby generating foam which can be separated. It will be understood that in addition to pulping, contact and ink removal steps described herein, the invention may be practiced using other process steps as are employed in wastepaper reclamation operations in general and office wastepaper in particular.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the instant invention as defined by the instant specification and claims.

The invention will be described below by the following examples which are provided for purposes of illustration and are not to be construed as limiting the invention.

ILLUSTRATIVE EMBODIMENTS

EXAMPLE 1

This example illustrates the deinking of xerographically printed paper carried out according to the process of the invention using as deinking agent a mixture of $C_9$ to $C_{11}$ predominantly linear and primary alcohols (about 18% wt. $C_9$, 42% wt. $C_{10}$ and 38% wt. $C_{11}$).

To test the performance of the invention, the following procedures were carried out for the deinking of xerographically printed wastepaper.

Sample Preparation. Xerographically printed paper was shredded by hand and mixed well. Unprinted margins of the paper were trimmed before shredding and collected for use as blank standard.

Hydrapulping and Deinking. Deionized water was heated to 40°–45° C. Sodium metasilicate pentahydrate was added to adjust the pH to about 9. To this was added 0.2 grams of the deinking agent (1% weight calculated on the weight of the pulp). This was added as a 1% solution or dispersion in deionized water. A slurry of about 5% consistency was prepared by adding 20 grams of shredded xerographically printed paper. This slurry was mixed for 30 minutes in a Hamilton-Beach mixer on the high speed stir setting.

This slurry was separated into two equal portions. One portion was subjected to flotation.

Flotation. Deionized water was heated to 40°–45° C. and about 2 liters placed in a Denver Flotation Machine. This unit consists of a stir motor, an impeller shaft and stirrer blade and a container for the pulp slurry. As the slurry is stirred, air is drawn down the hollow stirrer shaft and exits at the stirrer blades through small holes. The air bubbles created in the fashion rise through the pulp slurry taking ink particles with them. The froth at the top of the container is removed to separate the ink particles from the pulp slurry.

The pulp slurry was added to the container and diluted to a total volume of about 5 liters using additional 40°–45° C. deionized water. Pulp slurry consistency was about 0.4% by weight. This mixture was stirred for 10 minutes at 900 revolutions per minute while slurry foam was skimmed off and collected.

The slurry was decanted from the flotation cell without pulp loss and filtered through the 100 U.S. mesh screen.

Paper Making. Deinking process performance was measured by making paper from the deinked pulp and analyzing the paper for brightness and dirt count. The pulp was divided into four portions so that at least three, and preferably four, handsheets each weighing 3–4 grams could be made. Each portion of pulp was dispensed in 40°–45° C. tap water and poured into a Buchner funnel fitted with Whatman Number 40 filter paper and placed in a vacuum flask connected to a house vacuum line.

In the Buchner funnel, pulp was deposited forming a wet sheet, through which water drained rapidly. The sheet thus formed was covered with two pieces of thick dry filter paper (two above and two below) and the several layers then squeezed by rolling with a 30 lb. rolling pin. The layers were next removed from the apparatus and the prepared sheet separated from the filter papers. Finally, the prepared sheet was placed between four thick filter papers (two above and two below), pressed with a force of 50 psig, and dried between fresh thick filter papers at room temperature in the dark for about 24 hours.

The papers ("Buchner funnel pads") thus prepared were analyzed for brightness. Brightness measurements were made on the basis of percent light reflection from the sheet, using a standardized Technidyne S-4 Brightness Tester. Eight measurements were made for each sheet, one at the center of each of four quadrants on both sides, and the eight values averaged for the sheet. Normally, the eight separate measurements varied over a range of no more than about 1%. Reported brightness readings were the average of the brightness results for at least three similarly processed sheets.

The hand sheets were inspected for ink ("dirt") particles using an image analysis method. One inch by one inch square sections in each quadrant of the circular handsheet were studied. Images were directly input into an Applied Vision Systems ASA 2000 Image Analyzer. The dirt count (in parts per million) was determined for particles larger in area than 0.02 square millimeters.

The results of these tests are presented in Table I.

EXAMPLE 2

The procedures of Example 1 were repeated with the exception that the deinking agent used was a $C_{11}$ predominantly linear and primary alcohol.

The results are presented in Table I.

EXAMPLE 3

The procedures of Example 1 were repeated with the exception that the deinking agent used was a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

COMPARATIVE EXAMPLE A

The procedures of Example 1 were repeated with the exception that the deinking agent used was a mixture of 70% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$) containing an average of about 3 oxyethylene units per molecule and 30% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

COMPARATIVE EXAMPLE B

The procedures of Example 1 were repeated with the exception that the deinking agent used was a mixture of 65% by weight of a mixture of $C_{14}$ to $C_{15}$ predominantly linear and primary alcohols (about 52% wt. $C_{14}$ and 48% wt. $C_{15}$) containing an average of about 7 oxyethylene units per molecule and 35% by weight of a mixture of $C_{14}$ to $C_{15}$ predominantly linear and primary alcohols (about 52% wt. $C_{14}$ and 48% wt. $C_{15}$).

The results are presented in Table I.

COMPARATIVE EXAMPLE C

The procedures of Example 1 were repeated with the exception that the deinking agent used was a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$) containing an average of about 3 oxyethylene units per molecule.

The results are presented in Table I.

COMPARATIVE EXAMPLE D

The procedures of Example 1 were repeated with the exception that the deinking agent used was a mixture of 15% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$) containing an average of about 3 oxyethylene units per molecule and 85% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

EXAMPLE 4

This example illustrates the deinking of an office wastepaper stock containing 30% by weight xerographically printed paper and 70% by weight ledger grade paper utilizing as deinking agent a mixture of $C_{14}$ to $C_{15}$ predominantly linear and primary alcohols (about 52% wt. $C_{14}$ and 48% wt. $C_{15}$).

To test the performance of the invention, the following procedures were carried out for the deinking of xerographically printed/ledger grade wastepaper.

Sample Preparation. Xerographically printed/ledger grade paper was shredded by hand and mixed well. Unprinted margins of the paper were trimmed before shredding and collected for use as blank standard.

Hydrapulping and Deinking. Deionized water was heated to 40°–45° C. Sodium metasilicate pentahydrate was added to adjust the pH to about 9. To this was added 0.2 grams of the deinking agent (1% weight calculated on the weight of the pulp). This was added as a 1% solution or dispersion in deionized water. As slurry of about 5% consistency was prepared by adding 20 grams of shredded xerographically printed/ledger grade paper. This slurry was mixed for 30 minutes in a Hamilton-Beach mixer on the high speed stir setting.

This slurry was separated into two equal portions. One portion was subject to washing.

Washing. The pulp slurry was poured over a 100 U.S. mesh screen. The blender container and stir blades were rinsed over the mesh. The pulp retained on the screen was placed into a 1000 milliliter beaker and diluted to about 700 milliliters with 40°–45° C. deionized water. The resulting slurry was mixed well and again poured over the screen. This was repeated twice more.

Paper Making. Deinking process performance was measured by making paper from the deinked pulp and analyzing the paper for brightness and dirt count. The pulp was divided into four portions so that at least three, and preferably four, handsheets each weighing 3–4 grams could be made. Each portion of pulp was dispensed in 40°–45° C. tap water and poured into a Buchner funnel fitted with Whatman Number 40 filter paper and placed in a vacuum flask connected to a house vacuum line.

In the Buchner funnel, pulp was deposited forming a wet sheet, through which water drained rapidly. The sheet thus formed was covered with two pieces of thick dry filter paper (two above and two below) and the several layers then squeezed by rolling with a 30 lb. rolling pin. The layers were next removed from the apparatus and the prepared sheet separated from the filter papers. Finally, the prepared sheet was placed between four thick filter papers (two above and two below), pressed with a force of 50 psig, and dried between fresh thick filter papers at room temperature in the dark for about 24 hours.

The papers ("Buchner funnel pads") thus prepared were analyzed for brightness. Brightness measurements were made on the basis of percent light reflection from the sheet, using a standardized Technidyne S-4 Brightness Tester. Eight measurements were made for each sheet, one at the center of each of four quadrants on both sides, and the eight values averaged for the sheet. Normally, the eight separate measurements varied over a range of no more than about 1%. Reported brightness readings were the average of the brightness results for at least three similarly processed sheets.

The hand sheets were inspected for ink ("dirt") particles using an image analysis method. One inch by one inch square sections in each quadrant of the circular handsheet were studied. Images were directly input into an Applied Vision Systems ASA 2000 Image Analyzer. The dirt count (in parts per million) was determined for particles larger in area than 0.02 square millimeters.

The results are presented in Table I.

EXAMPLE 5

The procedures of Example 4 were repeated with the exception that the deinking agent used was a mixture of $C_9$ to $C_{11}$ predominantly linear and primary alcohols (about 18% wt. $C_9$, 42% wt. $C_{10}$, and 38% wt. $C_{11}$).

The results are presented in Table I.

EXAMPLE 6

The procedures of Example 4 were repeated with the exception that the deinking agent used was a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

COMPARATIVE EXAMPLE E

The procedures of Example 4 were repeated with the exception that the deinking agent used was a mixture of 70% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$) containing an average of about 3 oxyethylene units per molecule and 30% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

COMPARATIVE EXAMPLE F

The procedures of Example 4 were repeated with the exception that the deinking agent used was a mixture of 65% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$) containing an average of about 9 oxyethylene units per molecule and 35% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

EXAMPLE 7

The procedures of Example 1 were repeated with the exception that paper containing 30% by weight xerographically printed paper and 70% by weight laser printed paper was utilized and the deinking agent used was a $C_{11}$ predominantly linear and primary alcohol.

The results are presented in Table I.

EXAMPLE 8

The procedures of Example 7 were repeated with the exception that the deinking agent used was a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

COMPARATIVE EXAMPLE G

The procedures of Example 7 were repeated with the exception that the deinking agent used was a mixture of 70% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$) containing an average of about 3 oxyethylene units per molecule and 30% by weight of a mixture of $C_{12}$ to $C_{15}$ predominantly linear and primary alcohols (about 28% wt. $C_{12}$, 30% wt. $C_{13}$, 22% wt. $C_{14}$ and 20% wt. $C_{15}$).

The results are presented in Table I.

As can be seen in Table I, in a flotation deinking process, fatty alcohols used alone and containing 11 carbon atoms or less (Examples 1 and 2) were significantly more effective in removing ink from xerographically printed paper than were the fatty alcohol ethoxylate: fatty alcohol blends known in the art. Both the area of deinked sheets occupied by ink particles and the number of ink particles were substantially less in Examples 1 and 2 than in Comparative Examples A–D. A $C_{12}$ to $C_{15}$ fatty alcohol (Example 3) produced fewer ink particles than obtained in Comparative Examples A–D. However, the ink particle surface area in Example 3 was larger than that obtained in Comparative Examples A–D. The large ink particles in Example 3 could be more easily removed from deinked pulp using mechanical cleaners than the smaller ink particles obtained in Comparative Examples A–D.

Comparative Examples A, C and D and Example 3 form a series in which the amount of $C_{12}$–$C_{15}$ alcohol in a $C_{12}$–$C_{15}(EO)_3$:$C_{12}$–$C_{15}$ alcohol mixture was increased from 0% to 30% to 85% to 100%. Upon increasing the fatty alcohol content from 30% to 85% both the number of ink particles (Comparative Examples A and D), and the ink particle surface area decreased substantially. The ratio of particle count to ink particle area increased indicating an increase in average ink particle size. Comparative Example C formed a continuous trend with Comparative Examples A and D when considering average ink particle size (as suggested by the ratio of ink particle count to ink particle area). However, Example 3 exhibited discontinuous behavior in having a smaller number of ink particles than Comparative Example A, but fewer ink particles than Comparative Example D.

Example 3, 100% fatty alcohol, also exhibited discontinuous behavior compared to Comparative Examples A and D. The number of ink particles was greater than that obtained in Comparative Example D, but less than that obtained in Comparative Example A. The average ink particle size, as indicated by the ratio of the ink particle count to ink particle area, increased significantly when going from 85% fatty alcohol (Comparative Example D) to 100% fatty alcohol (Example 3).

The data of Examples 4–6 and Comparative Examples E and F in Table 1 were obtained in a wash deinking process. The wastepaper was a mixture of 70% ledger paper and 30% mixed office waste (mostly xerographically printed paper plus some laser printed paper). The $C_{14}$–$C_{15}$ fatty alcohol (Example 4) provided substantially higher brightness than the fatty alcohol ethoxylates-fatty alcohol blends of the prior art (Comparative Examples E and F). Ink particle count and ink particle surface area were similar in these three examples.

The other two fatty alcohols (Examples 5 and 6) produced a significantly lower brightness than Comparative Example F. However, the use of bleach would increase the brightness obtained in Examples 5 and 6. Ink particle counts and ink particle areas obtained in Examples 5 and 6 were less than those obtained in Comparative Examples E and F indicating more effective ink removal.

The data in the last three entries of Table I were obtained using a 1:1 mixture of xerographically printed paper and laser printed paper. A slightly higher brightness was obtained in Example 8 than in Comparative Example G. The ratio of ink particle area to ink particle count (0.0209–0.0211) indicates that average ink particle size was similar in these three experiments.

TABLE I

| Example Number | Alcohol Deinking Agent | Brightness (%) | Particle Area (ppm) | Particle Count | Yield Loss (%) |
|---|---|---|---|---|---|
| 1 | $C_9$–$C_{11}$ | 81.3 | 0–0.57 | 0–35 | 3.4–4.1 |
| 2 | $C_{11}$ | 80.2–82.5 | 0.50–0.85 | 35 | 4.0–5.3 |
| 3 | $C_{12}$–$C_{15}$ | 83.6 | 200 | 88 | 2.2 |
| Comparative A | 70:30 $C_{12}$–$C_{15}(EO)_3$:$C_{12}$–$C_{15}$ | 81.7 | 99 | 544 | 1.8 |
| Comparative B | 65:35 $C_{14}$–$C_{15}(EO)_7$:$C_{14}$–$C_{15}$ | 83.8 | 1.42 | 53 | 4.2 |
| Comparative C | $C_{12}$–$C_{15}(EO)_3$ | 84.5 | 1.40 | 70 | 4.5 |
| Comparative D | 15:85 $C_{12}$–$C_{15}(EO)_3$:$C_{12}$–$C_{15}$ | 83.1 | 41 | 53 | 5.0 |
| 4 | $C_{14}$–$C_{15}$ | 64.15 | 533 | 529 | — |
| 5 | $C_9$–$C_{11}$ | 54.47 | 187 | 203 | — |
| 6 | $C_{12}$–$C_{15}$ | 54.86 | 139 | 254 | — |
| Comparative E | 70:30 $C_{12}$–$C_{15}(EO)_3$:$C_{12}$–$C_{15}$ | 55.99 | 585 | 528 | — |
| Comparative F | 65:35 $C_{12}$–$C_{15}(EO)_9$:$C_{12}$–$C_{15}$ | 60.92 | 541 | 486 | — |
| 7 | $C_{11}$ | 84.8 | 132 | 6280 | — |
| 8 | $C_{12}$–$C_{15}$ | 86.4 | 156 | 7473 | — |
| Comparative G | 70:30 $C_{12}$–$C_{15}(EO)_3$:$C_{12}$–$C_{15}$ | 84.54 | 104 | 4929 | — |

What is claimed is:

1. A process for the deinking of office wastepaper stocks which consists essentially of
   a) converting the wastepaper to a pulp, b) contacting the pulp with an aqueous medium of alkaline pH containing between about 0.05 and about 2 percent by weight, calculated on a dry weight basis of the pulp, of a deinking agent which consists essentially of at least one fatty alcohol having in the range of from about 8 to about 18 carbon atoms, and c) treating the resulting pulp-containing medium by washing or flotation to removed suspended ink therefrom.

2. The process of claim 1 wherein said fatty alcohol has from about 8 to about 15 carbon atoms.

3. The process of claim 1 wherein said fatty alcohol has from about 9 to about 11 carbon atoms.

4. The process of claim 1 wherein said fatty alcohol is selected from the group consisting of a $C_9$-$C_{11}$ fatty alcohol blend, a $C_{11}$ fatty alcohol, a $C_{14}$-$C_{15}$ fatty alcohol blend, a $C_{12}$-$C_{15}$ fatty alcohol blend, a coconut fatty alcohol, a tallow fatty alcohol, a stearyl fatty alcohol and mixtures thereof.

5. The process of claim 1 wherein said $C_8$ to $C_{18}$ fatty alcohol is selected from the group consisting of a $C_9$-$C_{11}$ fatty alcohol blend, a $C_{11}$ fatty alcohol, a coconut fatty alcohol and mixtures thereof.

6. The process of claim 1 wherein said $C_8$ to $C_{18}$ fatty alcohol is a $C_{11}$ fatty alcohol.

7. The process of claim 2 wherein said $C_8$ to $C_{15}$ fatty alcohol is a $C_{11}$ fatty alcohol.

8. The process of claim 3 wherein said $C_9$ to $C_{11}$ fatty alcohol is a $C_{11}$ fatty alcohol.

9. The process of claim 1 wherein the aqueous medium contains between about 0.5 percent by weight and about 15 percent by weight of pulp and step b) of the process is carried out at a temperature in the range of from about 30° C. to about 100° C.

10. The process of claim 9 wherein the aqueous medium contains between about 1 percent by weight and about 5 percent by weight of pulp and step b) of the process is carried out at a temperature in the range of from about 40° C. to about 80° C.

11. The process of claim 1 wherein the aqueous medium of alkaline pH has a pH in the range of from about 7 to about 13.

12. The process of claim 11 wherein the aqueous medium of alkaline pH has a pH in the range of from about 8 to about 10.

13. The process of claim 1 wherein in step b) said deinking agent is added in a quantity between about 0.2 percent by weight to about 1.5 percent by weight.

14. The process of claim 13 wherein in step b) said deinking agent is added in a quantity between about 0.2 percent by weight to about 1.0 percent by weight.

15. A process for the deinking of office wastepaper stocks which consists essentially of:

a) converting the wastepaper to a pulp, b) contacting the pulp with an aqueous medium of alkaline pH containing between about 0.05 and about 2 percent by weight, calculated on a dry weight basis of the pulp, of a deinking agent which consists essentially of at least one fatty alcohol selected from the group consisting of a $C_9$-$C_{11}$ fatty alcohol blend, a $C_{11}$ fatty alcohol, a $C_{12}$-$C_{15}$ fatty alcohol blend, a tallow fatty alcohol, a stearyl fatty alcohol, a coconut fatty alcohol, a $C_{14}$-$C_{15}$ fatty alcohol blend and mixtures thereof, and c) treating the resulting pulp-containing medium by washing or flotation to removed suspended ink therefrom.

16. The process of claim 15 wherein said fatty alcohol is a $C_{11}$ fatty alcohol.

* * * * *